Feb. 19, 1935.  W. H. COOK  1,992,004
BRAKE FOR SLEDS OR SLEIGHS
Filed April 30, 1934
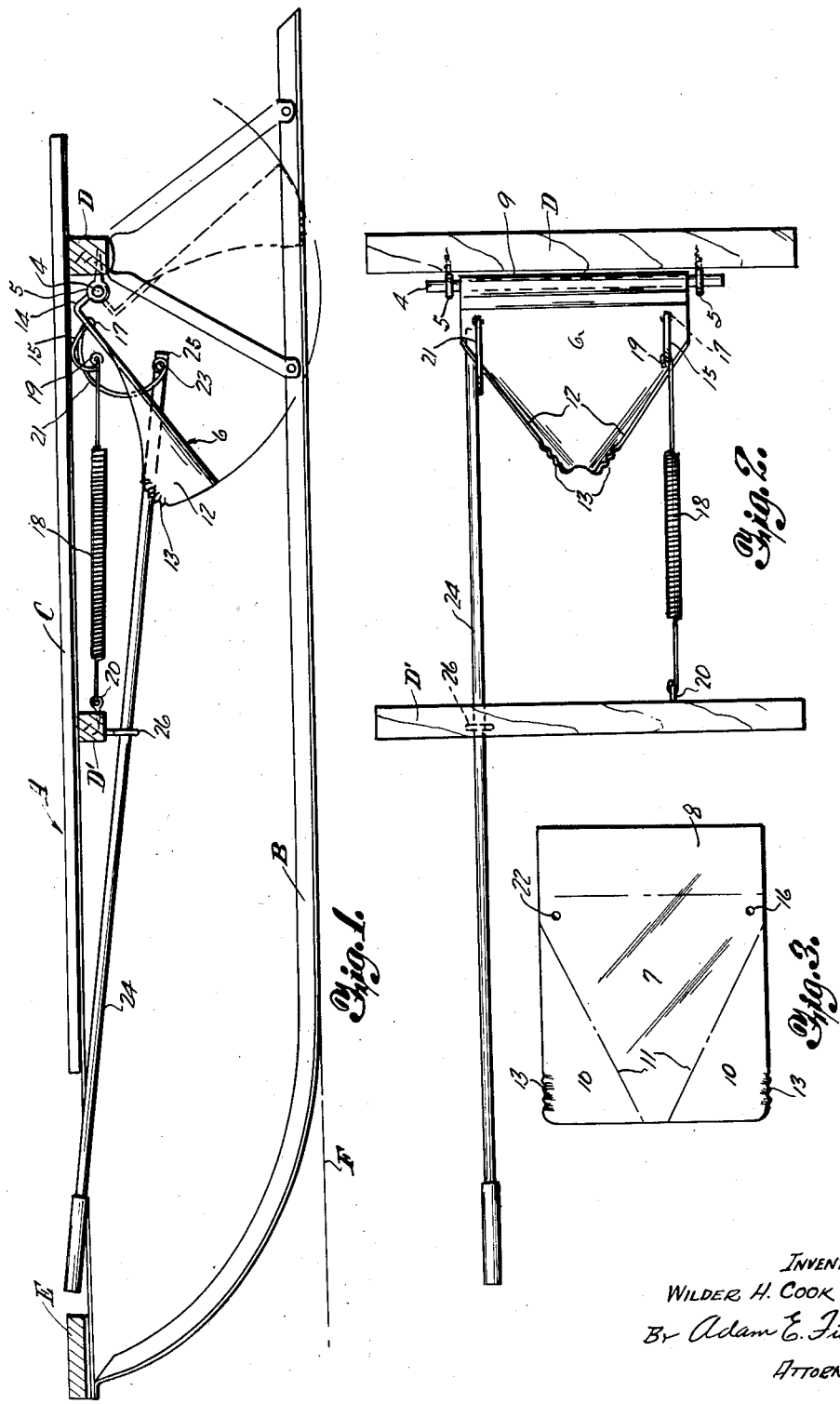
INVENTOR
WILDER H. COOK
By Adam E. Fisher
ATTORNEY Patented Feb. 19, 1935

1,992,004

UNITED STATES PATENT OFFICE 1,992,004

BRAKE FOR SLEDS OR SLEIGHS

Wilder H. Cook, Athens, N. Y.

Application April 30, 1934, Serial No. 723,132

3 Claims. (Cl. 188—8)

My invention relates to brakes for sleds or sleighs and the main object is to provide a simple, practical and durable form of braking means which may be readily applied to the sled and which may be conveniently operated to quickly bring the sled to a standstill when so desired.

Another object is to provide a device of this kind comprising a drag pivotally supported beneath the sled and normally drawn forward and swung upward beneath the sled clear of the ground when not in use but which is of such length that when forced back to a trailing position by a handle conveniently disposed to the hand of the rider it will engage and drag against the snow or ice to bring the sled to a stop.

With these and other objects in view the invention resides in the novel construction and arrangement of parts as hereinafter fully set forth and claimed, reference being had to the accompanying drawing wherein:

Figure 1 is a longitudinal vertical section through a sled equipped with my brake, the dragging or braking position of the parts being shown in dotted lines.

Figure 2 is a plan view of the brake and parts of the sled to which it is attached.

Figure 3 is a plan view of the blank from which the drag is formed.

Referring now with more particularity to the drawing the reference character A designates a sled of conventional form including runners, one of which is shown at B, a platform or frame C supported on cross beams D and D' and the steering bar E, these parts being all entirely conventional and shown here merely to illustrate the mounting of my brake thereon. In accordance with my invention a rock shaft 4 is mounted along the rearmost cross beam D and pivotally supported thereon in screw eyes 5 screwed in the beam. A drag or brake member 6 is provided, made up from a blank 7 of sheet metal, one end of which is rolled at 9 and secured around the shaft 4 between the screw eyes 5 by welding the roll to the shaft or by other conventional means. The opposite corners 10 of the blank 7 are then rolled and turned up from the blank along diagonal lines 11 forming drag webs 12, the margins of which are corrugated near the corners or otherwise roughened as shown at 13 for a purpose to be described. Adjacent the rolled end 9, the drag is bent at right angles so that said rolled end is offset from the remainder of the drag as shown at 14. Near one lateral margin and adjacent the pivoted end of the drag a spring bracket arm 15 is mounted by placing its end through an aperture 16 and welding or otherwise securing it therein as indicated at 17. A retractile coil spring 18 is hooked at 19 to this arm 15 and is directed forwardly beneath the sled to the frontal cross beam D' where it is attached by a screw eye 20, the spring thus normally pulling and swinging the drag forwardly and upwardly beneath the sled clear of the ground or ice line F in which position the drag webs 12 are turned upwardly as shown in Figure 1. At the opposite side of the drag an operating bracket arm 21 is secured in similar manner in an aperture 22 located in lateral alignment with the aperture 16 and this arm is curved forwardly, downwardly and rearwardly to stand at its free end 23 forwardly and below the rock shaft 4. An elongated operating handle 24 is pivoted at its rear end at 25 to this free end of the operating arm 21 and extends forwardly to a point adjacent the steering bar E, this frontal end of the handle being slidably supported by a screw eye 26 depended from the frontal cross beam D' through which eye the handle passes.

The foregoing completes the construction of the brake. Normally the parts stand in the position shown in Figure 1 in full lines and interfere in no way with the normal use of the sled. However, in coasting, should it be desired to bring the sled to a halt the rider simply pushes rearwardly on the handle 24 which swings the drag 6 back as the rock shaft 4 rotates and until the drag assumes a somewhat trailing position as indicated in dotted lines in Figure 1. The length of the drag is calculated to bring the roughened corners 13 of the drag webs 12 into contact with the snow or ice when the drag assumes this position and the tension of the spring 18 holds the drag firmly against the surface exerting a considerable braking action on the sled and bringing it quickly to a standstill. This braking action is enhanced by the angularity or inclination of the drag webs relative to the line of travel of the sled brought about by the bending of these webs diagonally from the corners of the drag as described. Of course, as the drag swings back it will contact the snow or ice surface before reaching the trailing position in which it operates but the forward motion of the sled will pull the drag on back either slightly and momentarily raising the sled if the surface is very hard, or causing the drag to bite into that surface if it is at all soft. The offset bend 14 permits the drag to clear the cross beam D and other parts when swung rearwardly as shown.

It is thought that further details of the operation will be apparent without further description and while I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In combination with a sled, a rock shaft mounted beneath the sled, a drag mounted on the rock shaft and spring set to normally swing upward and forward beneath the sled, and means for swinging the drag to a trailing position in braking contact with the surface over which the sled travels, the said drag including corrugated drag webs angularly inclined relative to the line of travel of the sled.

2. In combination with a sled, a rock shaft journaled crosswise beneath the sled, a drag secured at one end to the rock shaft, the free corners of the drag being bent diagonally from the drag and corrugated along their edges, a rectractile coil spring attached to the drag and extended forwardly beneath the sled and secured thereto, a curved operating bracket arm attached to the drag, and a handle pivoted to the arm and slidably mounted and extended forwardly beneath the sled.

3. In combination with a sled, a rock shaft journaled crosswise beneath the sled, a drag secured at one end to the rock shaft, the free corners of the drag being bent diagonally from the drag and corrugated along their edges, a rectractile coil spring attached to the drag and extended forwardly beneath the sled and secured thereto, a curved operating bracket arm attached to the drag, and a handle pivoted to the arm and slidably mounted and extended forwardly beneath the sled, the said drag being adapted when swung back and downward to contact in a trailing position the surface over which the sled is moving.

WILDER H. COOK.